(12) United States Patent
Miyazaki (10) Patent No.: US 6,972,396 B2
(45) Date of Patent: Dec. 6, 2005

(54) ELECTRIC PART HEATING DEVICE AND ELECTRIC PART HANDLING DEVICE

(75) Inventor: Mitsuhiko Miyazaki, Higashiosaka (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 10/688,414

(22) Filed: Oct. 17, 2003

(65) Prior Publication Data

US 2004/0206740 A1   Oct. 21, 2004

(30) Foreign Application Priority Data

Apr. 15, 2003  (JP) .............................. 2003-110145

(51) Int. Cl.[7] .............................. B23K 3/02; H05B 3/00
(52) U.S. Cl. ..................... 219/229; 228/51; 294/99.2
(58) Field of Search ................................ 219/229–231, 219/234, 236–239, 541; 228/51; 294/99.2, 294/119.1; 433/162; 606/210–211

(56) References Cited

U.S. PATENT DOCUMENTS

| | | | |
|---|---|---|---|
| 2,334,252 A | 11/1943 | Darling | |
| 2,735,923 A * | 2/1956 | Juvinall et al. | 219/237 |
| 3,304,111 A | 2/1967 | Kauh et al. | |
| 3,654,427 A * | 4/1972 | Schoenwald | 219/241 |
| 3,716,692 A * | 2/1973 | Schick et al. | 219/241 |
| 3,804,320 A * | 4/1974 | Vandermark | 228/19 |
| 4,034,202 A | 7/1977 | Vandermark | |
| 4,182,948 A * | 1/1980 | Markum et al. | 219/541 |
| 4,553,021 A * | 11/1985 | Conti | 219/234 |
| D299,207 S | 1/1989 | Arehart | |
| D299,208 S | 1/1989 | Arehart | |
| D299,209 S | 1/1989 | Arehart | |
| D301,011 S | 5/1989 | Gardner | |
| 5,002,323 A * | 3/1991 | Idsund | 294/100 |
| 5,145,101 A | 9/1992 | Brown et al. | |
| 5,246,157 A | 9/1993 | Siegel | |
| 5,412,178 A * | 5/1995 | Tamura | 219/241 |
| D381,880 S | 8/1997 | LaValley et al. | |
| 5,690,847 A | 11/1997 | LaValley et al. | |
| 5,837,973 A * | 11/1998 | Tamura | 219/241 |
| 5,938,258 A * | 8/1999 | Femling | 294/104 |
| 6,235,027 B1 * | 5/2001 | Herzon | 606/51 |
| D449,969 S | 11/2001 | Pretzell | |
| 6,750,431 B2 * | 6/2004 | Miyazaki | 219/234 |

FOREIGN PATENT DOCUMENTS

| | | | |
|---|---|---|---|
| DE | 19929255 | * | 2/2001 |
| EP | 1086772 A2 | | 3/2001 |
| GB | 1289816 | * | 9/1972 |
| GB | 1507033 | * | 4/1978 |

* cited by examiner

*Primary Examiner*—John A. Jeffery
(74) *Attorney, Agent, or Firm*—Squire, Sanders & Dempsey L.L.P.

(57) ABSTRACT

Disclosed is a heating device having a elongated body to heat an electric part for soldering or desoldering the electric part. The heating device includes a tip through which the heat is applied to the part, a heater for heating the tip and a temperature sensor for detecting temperature at the tip. The heater and the temperature sensor are longitudinally distant from each other. The temperature sensor is located in a forward portion of the body to be close to the tip. The heater includes a heater core of high heat conductive material, and a heating coil wound around the heater core, with heat being conducted through the heater core in the longitudinal direction of the body to the tip.

17 Claims, 7 Drawing Sheets

ELECTRIC PART HEATING DEVICE AND ELECTRIC PART HANDLING DEVICE

CROSS-REFERENCE TO RELATED APPLICATIONS

This application is based on Japanese Patent Application No. 2003-110145, filed in the Japan Patent Office on Apr. 15, 2003, the contents of which are hereby incorporated by reference.

BACKGROUND OF THE INVENTION

1. Field of the Invention

This invention relates to a heating device having a substantially rod-shaped body for supplying heat from one end of the body to an outside thing, and the invention is useful as a heating device which is required to be compact in size. More particularly, this invention pertains to an electric soldering device including the heating device as mentioned above or a hand-held tweezer type device having two legs with each leg having the heating device as mentioned above for heating and melting solder at joints between an electric or electronic part and the substrate and for installing and/or removing the electric or electronic part on or from a substrate.

2. General Background and State of the Art

Figure 9:
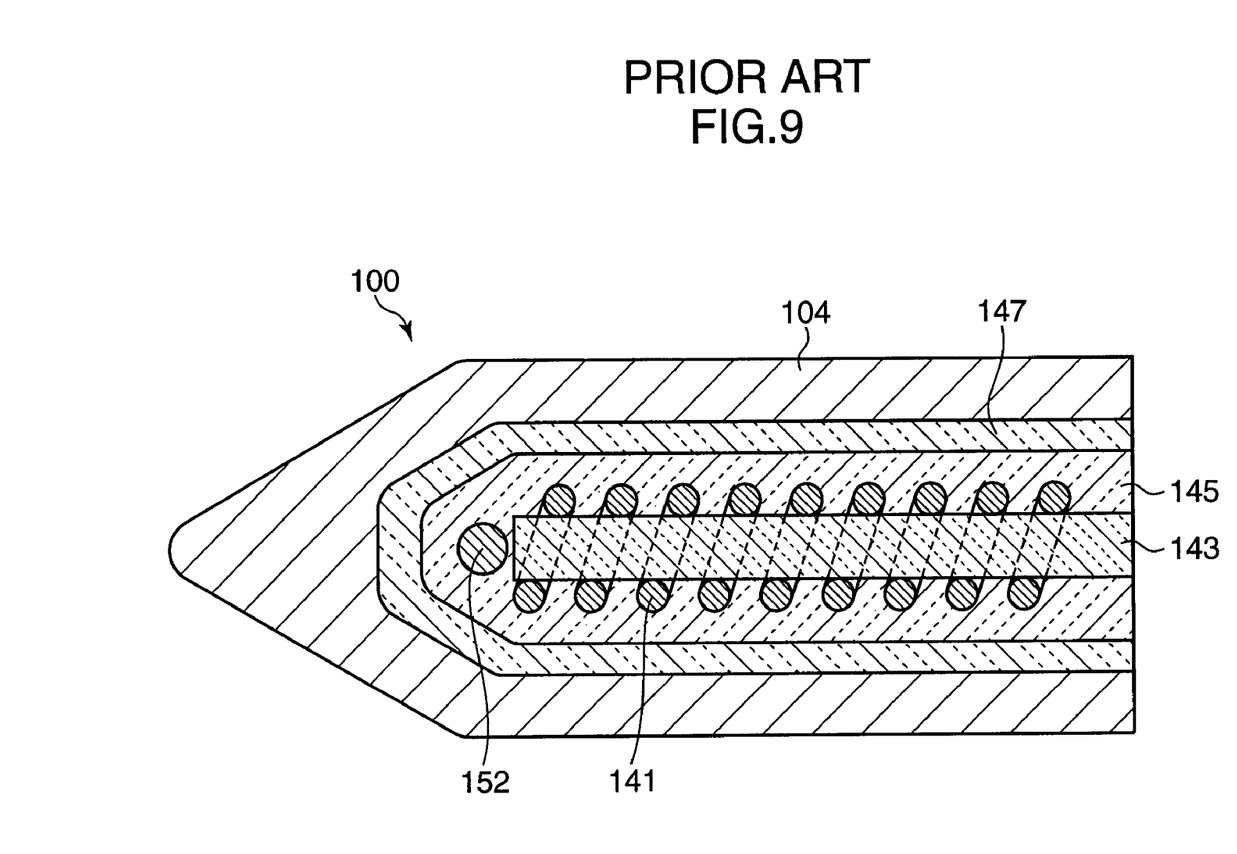
FIG. 9 is a cross-sectional view of a soldering tip of a conventional soldering iron.

Known is a heating device which has a substantially rod-shaped body and is arranged to supply heat from a free end of the body to an outside thing, such as an electric part soldered on a substrate, such as a printed circuit board. The known device includes a heat generating section electrically energized to generate heat and a temperature sensor for detecting the temperature at the free end which is being heated by the heat generating section. An example of such a heating device is shown in FIG. 9, which is a cross-sectional view of a tip portion 100 of a soldering iron. With reference to the Figure, the left side end of the tip portion 100 is the free end through which heat is supplied to an electric part. A heater core 143 is provided within the tip portion at its radial center, and a heating coil 141 is wound around the heater core 143. A temperature sensor 152 is located closer to the free end than the heater core 143. The heater core 143, heating coil 141 and temperature sensor 152 are embedded in and covered by a ceramic cover 145. A tip 100 of heat conductive metal material including copper or silvers as its main material is provided outside of the ceramic cover 145 and is fixed thereto by fixing ceramic 147. The tip 100 extends to the free end and is plated with a thin iron layer on its outer surface for protection from erosion.

The known heating device mentioned above has a structure such that the tip 100 is formed with a cavity for accommodating therein the heating coil 141 and the temperature sensor 152. Being accommodated within the tip 100, the coil 141 and the temperature sensor 152 are necessarily arranged close to each other. Japanese Laid-Open Patent Application No. 2001-121260 discloses an example of such an arrangement illustrating a heating coil and a temperature sensor arranged close to each other within a cavity formed in a tip for a soldering iron.

Figure 10A:
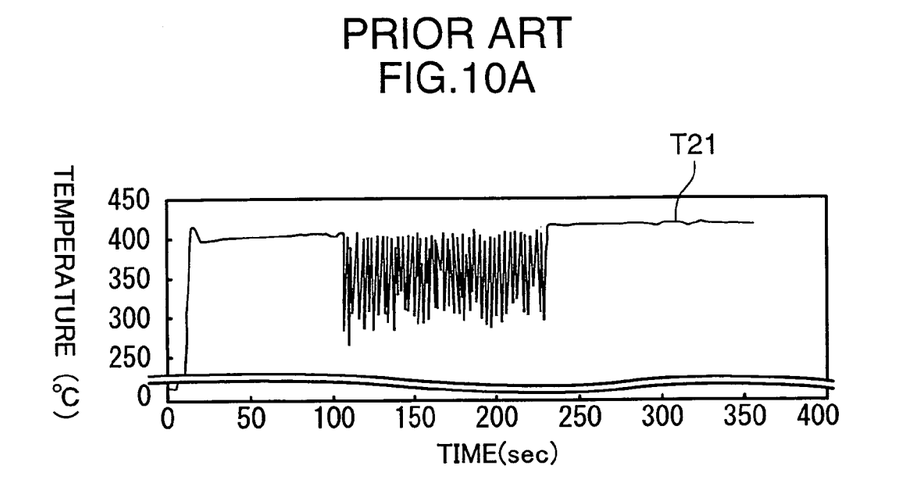
FIG. 10A shows the characteristic temperature in successive soldering at intervals of three seconds.
Figure 10B:
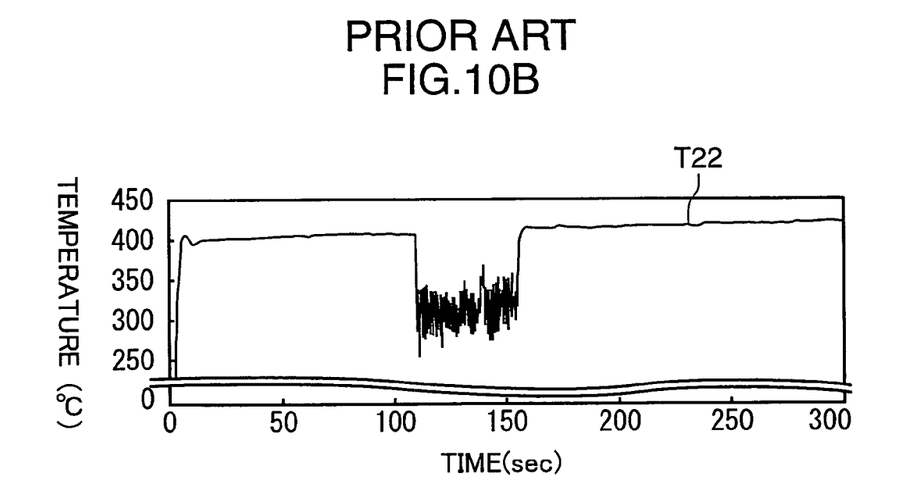
FIG. 10B shows the characteristic temperature in successive soldering at intervals of one second.

The conventional soldering iron has a problem in that the temperature at the tip will not restore sufficiently when soldering operations are made successively at short intervals. Accordingly, it is necessary to set intervals relatively large for ensuring desired soldering, which is one of factors to impede improvement in efficiency of soldering operations. This problem will be described in more detail with reference to FIG. 10, which shows a temperature characteristic of the known device at the tip 104 at the time of the successive soldering. FIG. 10A and FIG. 10B show temperature characteristics in the successive soldering operations respectively at intervals of three seconds and one second, with the x-axis showing elapsed time and the y-axis showing temperature.

Referring to FIG. 10A showing a temperature characteristic T21, the temperature is maintained at 400° C. for about 100 seconds from the beginning, and after about 230 seconds thereon. During that time period, no soldering operation is made. For the period from about 100 seconds to 230 seconds, the temperature oscillates with a large amplitude to show that the soldering operation is made successively. Each cycle of oscillation represents a single soldering operation. As seen in the FIG. 10A, when a soldering operation is made, the temperature at the tip temporarily drops by about 100° C. since heat is supplied to solder. The temperature drop is detected by the temperature sensor 12, which in turn causes an increase in the power supply to the heating coil 141 by a control section (not shown). As a result, the temperature at the tip tends to increase and restore such that the temperature is maintained at a desired level. However, when the soldering is repeated at intervals of one second, the temperature does not restore to a desired level as shown by temperature characteristic T22 in FIG. 10B. This is because the subsequent soldering operation is started before the temperature restores to its initial level. This phenomenon is likely to occur especially when the tip 104 is relatively small.

The tip of the soldering iron must be heated above a given level to ensure sufficient soldering. In successive soldering operations, intervals of the successive soldering should be enough for the temperature at the tip to restore to a desired level. Accordingly, it is desired that the temperature restoring characteristic be improved and the intervals for the restoration of the temperature at the tip is shortened, thereby improving the efficiency of the successive soldering operation. Such improvement is significant where the tip is relatively small in size.

INVENTION SUMMARY

It is a primary object of the present invention to provide a heating device which is efficient in successive soldering operations.

It is another object of the present invention to provide a heating device which shows good temperature restoring characteristics in successive soldering operation.

It is a further object of the present invention to provide a compact type heating device which is efficient in successive soldering operations.

It is still another object of the present invention to provide a soldering device which enables efficient successive soldering operations.

It is yet another object of the present invention to provide a tweezer type hand-held electric part handling device for efficiently installing and/or removing electric part on or from a substrate.

It is yet another object of the present invention to provide a tweezer type hand-held electric part handling device for efficiently installing and/or removing electric parts on or from a substrate.

It is yet a further object of the present invention to provide a tweezer type hand-held electric part handling device having an improved temperature control arrangement for the control of the tip temperature.

To attain one or more of the above-mentioned objects, an electric heating device having a substantially rod-shaped body for applying heat from an end portion of the body to an outside material comprising a heat generating member which is electrically energized to generate heat for heating the end portion of the body, and a temperature sensor for detecting the temperature at the end portion, the temperature sensor being located distant from the heat generating member in the longitudinal direction of the body is disclosed.

According to an aspect of an embodiment of the present invention, the temperature sensor is located in a forward portion of the body and the heat generating member includes a heater core of high heat conductive material in addition to a heating coil wound around the heater core. Heat is conducted through the heater core in the longitudinal direction of the body from the heat generating member to the end portion of the body.

According to another aspect of an embodiment of the present invention, an electric soldering iron comprises a substantially rod-shaped body including a tip for applying heat from the tip to an electric part; a heat generating member which is electrically energized to generate heat for heating the tip; and a temperature sensor for detecting the temperature at the tip, the temperature sensor being located distant from the heat generating member in the longitudinal direction of the body.

According to yet another aspect of an embodiment of the present invention, the embodiment takes a form of a hand-held tweezer-type electric part heating and holding device comprising a pair of legs, each leg including a heating device as mentioned above.

The above and other features, objects and advantages of the present invention will become more apparent from the following description of a preferred embodiment with reference to the following drawings.

FIGS. 1A and 1B are side views of a hand-held tweezer-type device according to an embodiment of the present invention, the device being in a condition biased to open the legs and wherein FIG. 1A shows a free condition of the device and FIG. 1B shows an-operated condition of the same.

FIGS. 2A and 2B show internal configuration of the hand-held device shown in FIGS. 1A and 1B, the device being in a free condition, and wherein FIG. 2A shows the normal condition where the legs are biased in an opening direction, and FIG. 2B shows the condition where the legs are biased in a closing direction.

FIGS. 3A, 3B and 3C are views of a leg of the hand-held device, wherein FIG. 3A is a front elevation view, FIG. 3B is a plan view and FIG. 3C is a left-side view of the leg.

FIGS. 4A and 4B are cross-sectional views of the leg, wherein

FIGS. 6A and 6B are graphs which show temperature variation characteristics of a soldering tip of the embodiment the device of FIG. 1A in successive soldering operations, wherein

FIGS. 7A, 7B and 7C show a first alternative embodiment of a tip, wherein FIG. 7A is a front elevation, FIG. 7B is a plan view and FIG. 7C is a left-side view of the tip.

FIGS. 8A, 8B and 8C show a second alternative embodiment of a tip, wherein FIG. 8A is a front elevation, FIG. 8B is a plan view and FIG. 8C is a left-side view of the tip.

FIGS. 10A and 10B show temperature variation characteristics of a soldering tip of the conventional soldering iron of FIG. 9 in successive soldering operations, wherein

Figure 1A:
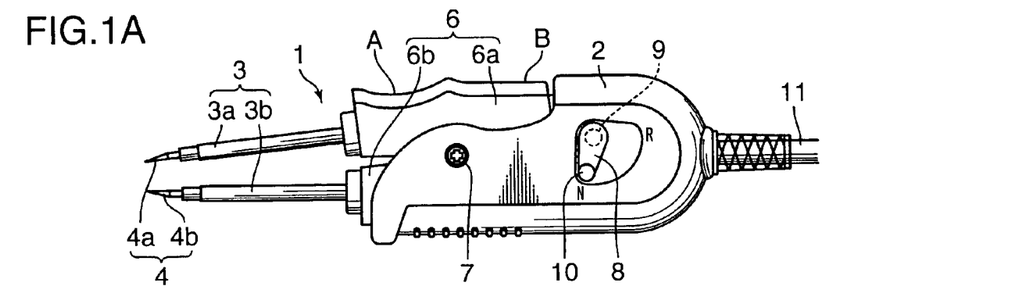
Figure 1B:
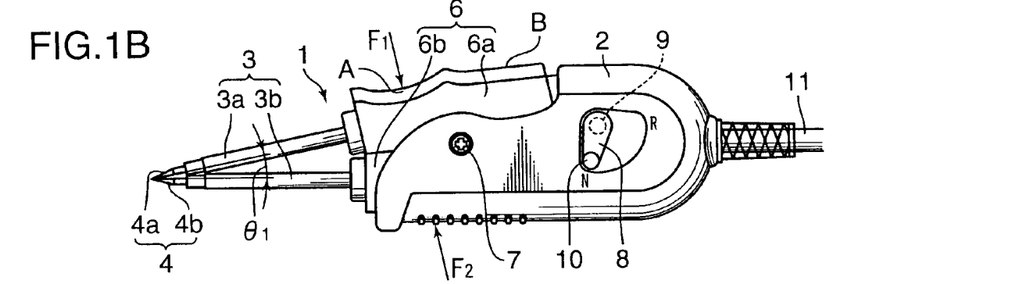
Figure 2A:
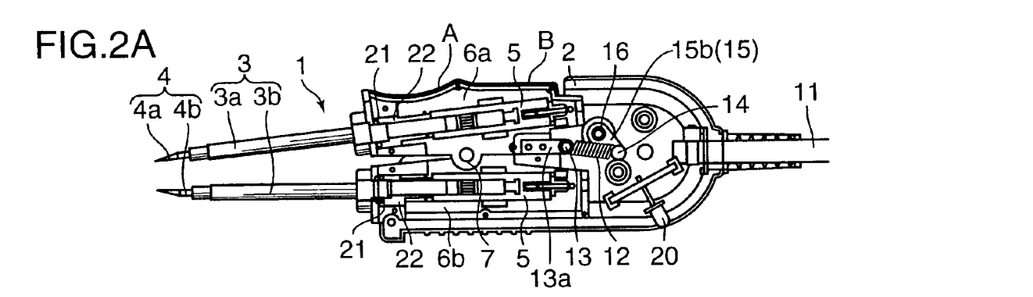
Figure 2B:
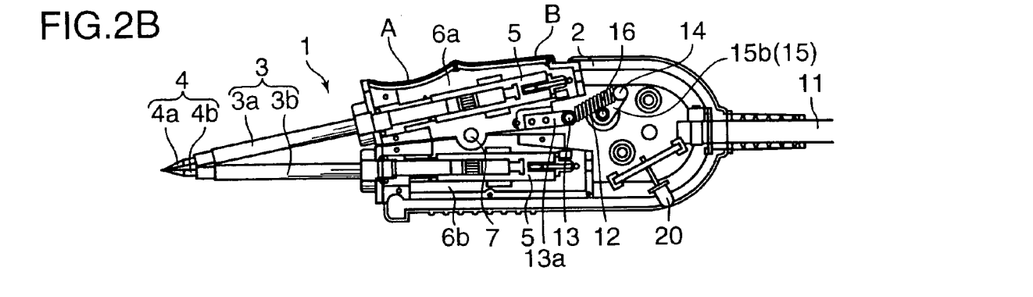

A description will be made with reference to the accompanying drawings wherein like reference characters and numerals refer to like parts. FIGS. 1A and 1B show a hand-held tweezer-type electric part handling device 1 according to an embodiment of the present invention. The device is used for installing (or mounting) and/or removing an electric part such as a resistor, capacitor, transistor, diode and IC. (Those electric or electronic parts are generally referred to electric parts.) The device 1 has a pair of legs 3 (3a and 3b) which are biased to open in a normal bias condition such that the legs assume an open position as shown in FIGS. 1A and 2A when no operating force is exerted on the device 1. In a reverse bias condition of the device 1 as shown in FIG. 2B, the legs 3 are biased to close in a free condition when no operating force is exerted on the device 1. Referring to FIGS. 1 and 2, FIGS. 1A, 2A and 2B respectively show the device 1 in free condition, while FIG. 1B shows the device 1 in an operated or manipulated condition where an operating force is exerted on the device 1 by an operator or user as indicated by the direction arrow F1. In the following description, the left side of the device 1 as viewed in FIG. 1 is referred to as a front side, while the right side is referred to as a rear side. The upper side in the FIG. is referred to as an upper side of the device 1 and the lower side is referred to as a lower side of the device 1. The front side of the drawing is referred to as a fore side of the device 1, while the back side of the drawing is referred to as a back side of the device 1.

The electronic part handling device 1 is provided with a thin housing 2 of a shape convenient for grasping. Sleeves 6 (6a and 6b) for respectively holding legs 3 (3a and 3b) are provided in the housing 2. Referring to the sleeves 6, the upper side sleeve 6a is movable relative to the housing 2 while the lower side sleeve 6b is fixed on the housing 2 to be stationary during operation. The movable sleeve 6a is pivoted on the housing 2 by a supporting shaft or stud 7 to pivot around the supporting shaft 7. The movable sleeve 6a is formed with recesses A and B which serve as manipulation grip portions so that the operator may manipulate moveable sleeve 6a. The recesses A and B are formed to facilitate the manipulation of the movable sleeve 6a for the opening or closing of the legs 3 against biasing force.

As seen in FIGS. 1A and 2A, the legs 3 and tips 4 are aligned to be substantially straight relative to each other such that the dead angle is small when the tip 4 grasps or clamps an electronic part, thereby improving efficiency of operation in handling a small electric part. In addition, the substantially straight structure of the legs 3 and tips 4 provides a narrow clamp angle and facilitates installation and removal of a part in a narrow area. The clamp angle is an angle made by the legs 3a and 3band tips 4a and 4b when a part is held between the tips 4a and 4b.

A power supply cord or wire 11 extends from the rear of the housing to supply electric power to the device 1 from a main control circuit (not shown in the Figure). The electric power supplied through the cord or wire serves to energize the heater.

A biasing condition switching lever 8 is provided on the front surface of the housing 2 at the rear side thereof. The switching lever 8 is fixed on a supporting shaft 9 to turn therewith around the axis of the supporting shaft 9 for switching the biasing condition of the legs 3 between a normal bias condition for biasing the legs 3 to open and a reverse bias condition for biasing the legs 3 to close. A switching lever knob 10 is provided at or close to a free end of the switching lever 8 so that the operator or user may turn the switching lever 8 by holding the knob 10. The switching lever knob 10 may be labeled with marks "N" and "R" to indicate a set biasing condition. The mark "N" represents that the lever is set to a normal position for the normal biasing condition, and the mark "R" represents that the lever is set to a reverse position for the reverse biasing condition.

In the free condition in normal bias condition, the legs 3 assume an open position as shown in FIG. 1A. When the operator depresses the recess A downward with a force F1 which overcomes the biasing force for opening the legs, a counterclockwise movement is caused on the movable sleeve 6a and movable leg 3a, and the movable leg 3a turns counterclockwise around the supporting shaft 7 to close the legs 3. The force F2 is a reactive force or drag exerted in the direction opposite to the direction of the force F1 with a same magnitude with that of the manipulation force F1. Thus, the operator may grasp the housing 2 and applies apply the forces F1 and F2 to the housing 2 and the movable sleeve 6a from the opposite sides to close the legs 3.

In the closed position, the movable leg 3a and the stationary leg 3b make an included angle of 12° denoted as θ1. It is preferable that the included angle θ1 is 12° or in the vicinity of 12° preferably 10°~14°. If the included angle θ1 is smaller than 10°, the distance from the gripping position to the end of the tips 4 is so large that it is difficult for the operator to adjust the position of the tips 4 delicately. If the included angle θ1 is larger than 140, the dead angle increases at the time of grasping or clamping the part and it is difficult to mount or remove an electronic or electric part in a narrow area. According to the present embodiment, as the legs 3 and tips 4 extend substantially straight and the included angle of the legs 3 at their closed condition is 10°~14°, most preferably 12°, delicate positioning of the tips 4 is available and the dead angle at the time of grasping an electronic part is small. This improves the visibility of the electronic part while the operator handles, e.g. installs or removes, the part. In addition, it is easy to install and remove the part on and from a substrate in a narrow area.

When the switching lever 8 is turned from the position shown in FIG. 1 to the position where the knob 10 is registered with the mark R, the device 1 is switched to the reverse bias condition. In the reverse bias condition, the legs 3 are closed in their free condition, and the legs 3 are opened when the operator depress depresses down the rear upper portion of the movable sleeve 6a, i.e. the recess B.

FIGS. 2A and 2B show the internal structure of the housing 2 and the sleeves 6 of the electric part handling device 1. FIG. 2A shows the device 1 in the free and normal bias condition. FIG. 2B shows the device 1 in the free and reverse bias condition. As shown in those Figures, a socket 5, O-ring 21 and a leg fixing chuck 22 are assembled in the interior of each sleeve 6, and the legs 3 are fixedly held by the sleeves 6 respectively with portions of the legs 3 fitted in the sockets 5. An LED 20 is provided on the rear downward position of the housing 2 to indicate whether the heaters built in the legs have been calibrated with respect to their heat or temperature.

A tension coil spring 12 is provided within the housing 2 at its vertically central and horizontally rearward position to bias the legs 3 to selectively open and close the legs 3. The coil spring 12 serves as a biasing member commonly used for biasing or urging the movable sleeve 6a and the movable leg 3a toward an opening direction in the normal bias condition and toward a closing direction in the reverse bias condition. A first spring support rod 13 is fixed on a link member 13a which, in turn, is fixed on a rear end of the movable sleeve 6a. The first spring support rod 13 extends horizontally in the direction from the front to the back of the housing. One end of the coil spring 12 is connected to the first spring support rod 13, with a circular end of the coil spring 12 being wound around the support rod 13 and the circular end being allowed to rotate around the rod 13. The other end of the coil spring 12 is connected to a second spring support rod 14 carried on first and second swingable links 15, with another circular end of the coil spring 12 being wound around the support rod 14 and the circular end being allowed to rotate around the rod 14. The second spring support rod 14 is connected to the first swingable link 15a at a front side end of the rod 14. The first swingable link 15a is fixed on a switching lever supporting shaft 9 to turn therewith. The second spring support rod 14 is connected to the second swingable link 15b at a back side end of the rod 14. In this way, the switching lever 8, the switching lever supporting shaft 9 and the swingable links 15 serve to switch the biasing condition of the coil spring 12.

Figure 3A:
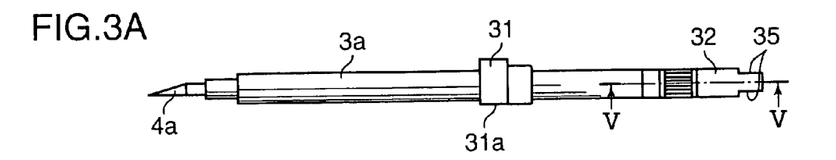
Figure 3B:
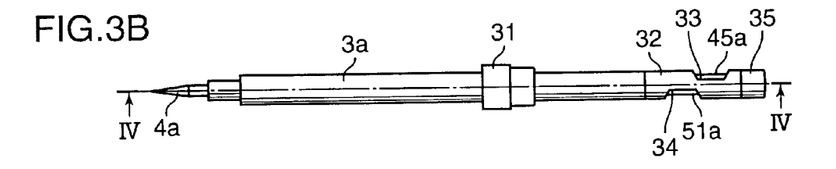
Figure 3C:
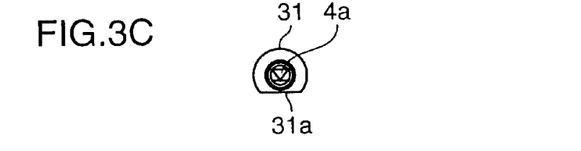
Figure 4A:
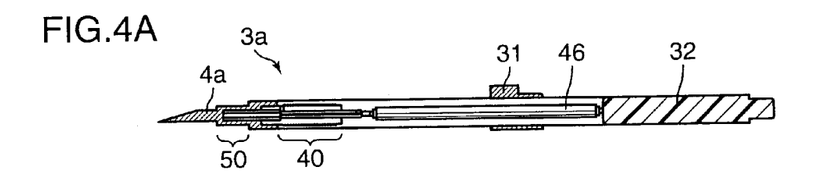
FIG. 4A is a cross-section taken along IV—IV of FIG 3B
Figure 4B:
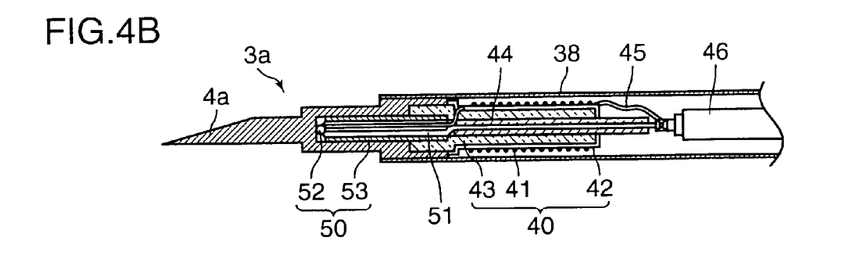
FIG. 4B is a fragmentary enlarged cross-section of an end portion of the leg.

FIGS. 3A, 3B and 3C show an outer appearance of the movable leg 3a which is to be inserted in the movable sleeve 6a. FIG. 3A is a front elevation, FIG. 3B is a plan view and FIG. 3C is a left side view of the movable leg 3a. FIG. 4A is a cross-section taken along IV—IV of FIG. 3B. FIG. 4B is an enlarged cross-sectional view of a free end of the tip. The movable leg 3a includes a movable tip 4a fitted in a front portion of a protective pipe 38 of stainless steel, and plug 32 of a synthetic resin inserted in the rear of the pipe 38. The tip 4a is made of a metal including copper or silver as a principal component. A fixing pipe 31 is provided on the middle portion of the protective pipe 38 at a position somewhat rearward thereof. The fixing pipe 31 is formed with a partially flat portion 31a. When the movable leg 3a is inserted in the movable sleeve 6a, the movable leg 3a is fixed in the movable sleeve 6a at the portion of the fixing pipe 31, with the flat portion 31a being fitted to corresponding flat portion (not shown) of the movable sleeve 6a to determine the rotational position of the movable leg 3a relative to the movable sleeve 6a. The plug 32 is formed with a flat plane 35 at its rear end to determine the rotational position of the movable leg 3a relative to the movable sleeve at the portion of the plug 32.

A heater 40 is provided within the protective pipe 38 at its front portion, with the heater 40 extending from a forward portion to the rear of the tip 4a. The heater 40 is electrically energized to generate heat. A heater core 43 is provided at the radially central portion of the heater 40 with the front portion of the heater core 43 being embedded in the rear portion of the tip 4a connected with the movable leg 3a. The heater core 43 is made of a high heat-conductive material such as copper. A heater core cover 42 covers the exposed portion of the heater core 43. A heating coil 41 is wound around the heater cover 42. Thus, the heat generated by the heating coil 41 is conducted to the heater core 43 via the heater cover 42 and to the tip 4a on the movable leg 3a via the heater core 43 so that the tip 4a is heated up to 350°–400° C. to serve as a soldering iron.

It is common with conventional soldering irons or electric part soldering and/or desoldering devices that a heater is provided within a tip. In other words, the heat generated by a heater coil is conducted radially outward to heat the tip. In such conventional devices, it is likely that the diameter of the tip is large in size. Accordingly, it is necessary to bend the end portion of the tip inwardly in order to keep relatively small the distance from the heater to the end of the tip. If the distance is large, efficiency of heat conduction and heat response will be lowered. According to the present embodiment, the protective pipe 38 and tip 4a of the movable leg 3a are small in diameters so that heater 40 and tip 4a may take a straight shape. With this structure, the included angle θ1 of legs at their closed condition may be made relatively small, e.g. between 10°–14°, most preferably 12°.

A heat sensor section 50 is provided at or in the vicinity of the radially central portion within the tip 4a and frontward from the heater 40 to detect the temperature at the end portion of tip 4a, with the output of the sensor section 50 being transmitted to a control circuit (not shown) which controls the power supply to the heating coil 41 in response to the output of the sensor section 50. For example, when the temperature at the tip 4a is lower than a predetermined threshold value, the control circuit turns on the power supply. When the temperature at the tip 4a is higher than another predetermined threshold value, the control circuit turns off the power supply. Thus, the temperature at the tip is maintained within a given range. As an alternative, the threshold for the heat control may be a single value to maintain the temperature at a desired value.

The sensor section 50 includes a temperature sensor 52 at the end portion of the sensor section 50 where the sensor section is in contact with the movable tip 4a. Approximately rearward of the sensor 52 is provided a sensor insulating pipe 53 which forms a passage or conduit for the lead wire 51 for the sensor, and which also serves to keep the sensor 52 distant from or off the heater 40, preventing direct conduction of heat from the heater 40 to the sensor 52.

Figure 5:
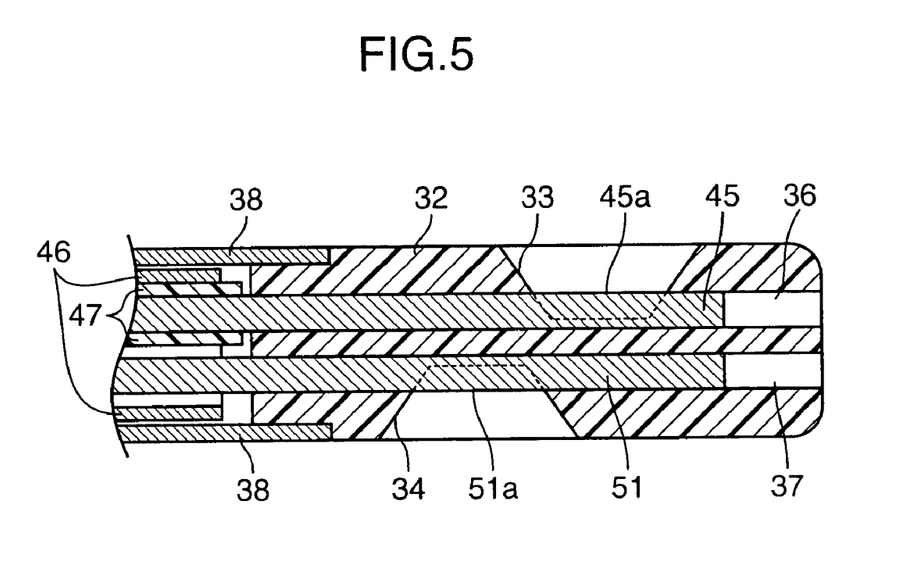
FIG. 5 is a cross-sectional view of a portion of the leg taken along V—V of FIG. 3A.

The sensor lead wire 51 and heater lead wire 45 are covered by the heater insulating tube 44 and sensor lead insulating tube 46 and are led to the plug 32 via the interior of the protective pipe 38. FIG. 5 is a cross section taken along V—V of FIG. 3A to show the internal structure of a main part of the plug 32. The heater lead wire 45 is covered by a heater lead insulating tube 47, which in turn is covered by a sensor lead insulating tube 46 along with the sensor lead wire 51. Accordingly, the heater lead wire 45 and the sensor lead wire 51 are insulated from each other and from the protective pipe 38 as well. The rear ends of those lead wires are respectively inserted into and held by a heater wire receiving hole 36 and a sensor wire receiving hole 37 which are formed in the plug 32. The plug 32 is formed with a first opening or notch 33 and a second opening or notch 34 which are axially shifted from each other and which respectively reach the heater wire receiving hole 36 and the sensor wire receiving hole 37. Accordingly, the exposed portion 45a of the heater lead wire 45 is exposed through the first opening or notch 33 and the exposed portion 51a of the sensor lead wire 51 is exposed through the second opening or notch 34.

The exposed portion 45a of the heater lead wire 45 and the exposed portion 51a of the sensor lead wire 51 are in contact with and electrically connected with corresponding electric terminals (not shown) provided on the movable sleeve 6a. In other words, those exposed portions 45a and 51a serve as electric terminals in the movable leg 3a. The heater lead wire 45 and the sensor lead wire 51 are nickel-plated for the portions respectively including the exposed portions 45a and 51a to reduce contact resistances. Those structures contribute to the compactness in size and cost reduction of the device 1 according to the present embodiment, as compared with conventional devices which are provided with electric terminals to be connected with lead wires.

It is to be noted that, in the present embodiment, the stationary leg 3b has the same structure as that of the movable leg 3a. Namely, a leg which has the structure of the movable leg 3a and is fixedly fitted in the stationary sleeve 6b, serves as the stationary leg 3b. In this way, the legs of the same structures are used for the movable leg 3a and the stationary leg 3b, thereby reducing the production cost.

The operator may set the electric part handling device 1 to the normal or reverse condition in accordance with the kind of operation, or his/her convenience of operation when he/she uses the device 1. In general, the normal condition is suitable for removing a part, while the reverse condition is suitable for installing a part.

The electric part handling device 1 can be used as a soldering iron. If used in the free and reverse bias condition with the legs 3 being closed, the device 1 serves as a soldering iron having a relatively large soldering tip. If used in the free and normal bias condition with the legs 3 being open, the device 1 serves as a soldering iron having a pair of relatively small soldering tips 4a and 4b. In the latter case, one of the legs 3a and 3b may be removed from the sleeve 6A or 6B for the convenience of handling.

When the electric part handling device 1 is used as the soldering iron, the temperature restoring characteristic in successive soldering is improved as compared with conventional soldering irons. In the conventional soldering irons, a heater is provided within a tip and a temperature sensor is provided close to the heater so that the temperature sensor is likely to detect the heat of the heating coil, thereby deteriorating the accuracy of detection of the temperature at the soldering tip. In particular, successive soldering at short intervals is affected significantly by the arrangement of the heater and heat sensor.

According to the present embodiment having the configuration described above, the temperature sensor 52 is less likely to directly detect the heat of the heating coil 41 so that the accuracy of detection of the heat at the tip 4 (4a or 4b) is improved. When the temperature sensor 52 detects a drop in the temperature at the tip 4 and the heater 40 increases the amount of heat generation in response to the output of the heat sensor 52, the temperature at the heater 40 raises first and then the temperature at the tip 4 raises with a delay. At this time, the temperature sensor of the conventional soldering iron is affected by the heat of the heater 40 to output a signal corresponding to a temperature which is higher than the actual temperature of the tip 4, so that the tip 4 is likely to be heated to a level lower than that necessitated. In contrast, in the electric part handling device 1 according to an embodiment of the present invention, the temperature sensor 52 is less likely to be affected by the heat of the heater 40 and can detect the temperature of the tip 4 with high accuracy so that the heater 40 is energized more and the temperature restoring characteristic is improved.

Figure 6A:
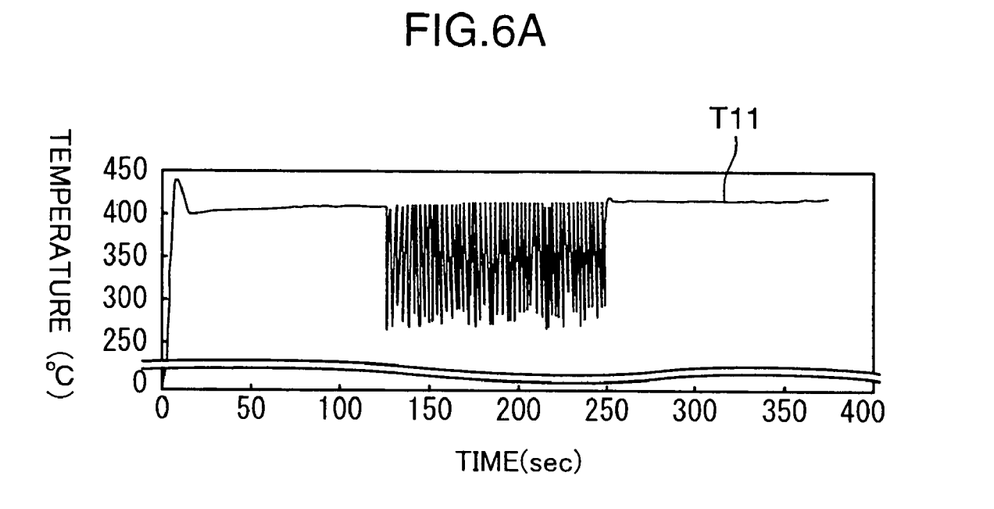
FIG. 6A shows the temperature characteristic in successive soldering at intervals of three seconds.
Figure 6B:
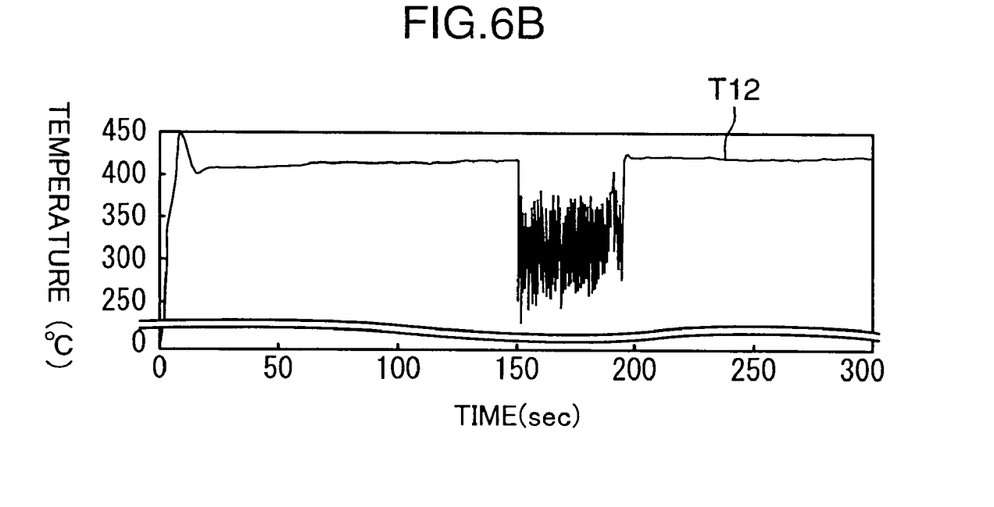
FIG. 6B shows the temperature characteristic in successive soldering at intervals of one second.

FIGS. 6A and 6B show temperature change characteristics of the soldering tip of the embodiment in successive soldering operations, wherein FIG. 6A shows the characteristic in successive soldering at intervals of three seconds, and FIG. 6B shows the characteristic in successive soldering at intervals of one second. In the graphs of the FIGS. 6A and 6B, the x-axis represents elapsed time and the y-axis represents the temperature at the tip.

In the characteristic T11 shown in FIG. 6A, soldering is not affected during the period when the temperature is maintained approximately at 400° C. For the period from 120 seconds to 250 seconds after the initiation of heating, the temperature oscillates with large amplitudes showing that soldering is affected during that period, with each cycle of the oscillation corresponding to a soldering operation. As seen in the Figure, the temperature at the tip 4 temporarily lowers by approximately 100° C. when soldering is made with the heat being supplied to the solder. The lowering of the temperature is detected by the temperature sensor 52 and a control circuit (not shown) will increase supply of electric power to the heating coil thereafter. As a result, the amount of heat generated increases and the temperature of the tip 4 increases to, restores to and is maintained at a desired level.

FIG. 6B shows the case where the successive solder is affected at an interval of one second. In that case, a phenomenon occurs where the temperature does not restore to a predetermined level as shown by characteristic T12. This is because the subsequent soldering operation is carried out and lowers the temperature before the temperature at the tip restores to the predetermined level. However, according to the embodiment of the present invention, the drop of the temperature is relatively small and is about 50° C. from the desired level. On the other hand, in the case of the conventional device of which characteristic T22 is shown in FIG. 10B, the temperature drops by 80° C. This comparison shows that the present embodiment is improved in the temperature restoring characteristic. According to the present embodiment which shows good temperature restoring characteristic, the efficiency of successive soldering operations is much improved.

According to another aspect of the embodiment of the present invention, an electric part handling device has a pair of legs, each having a tip made of a metal including copper or silver as a main component, to position and solder the electric part on a substrate or desolder and remove the electric part from the substrate while holding the electric part between the tips.

As an embodiment of the present invention has been described in the above, the present invention is not limited to the particular structure and operation of the embodiment, but may be varied and modified within the spirit and scope of the invention as will be claimed in the attached claims.

Figure 7A:
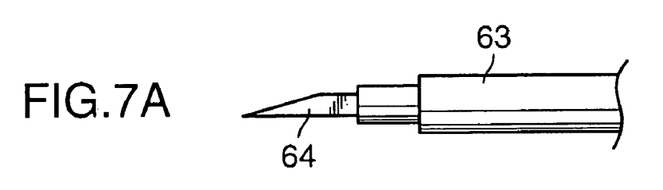
Figure 7B:
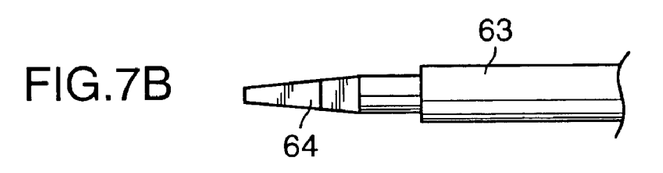
Figure 7C:
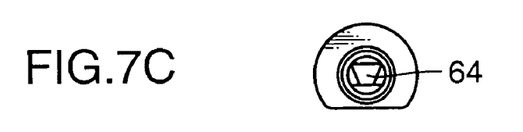
Figure 8A:
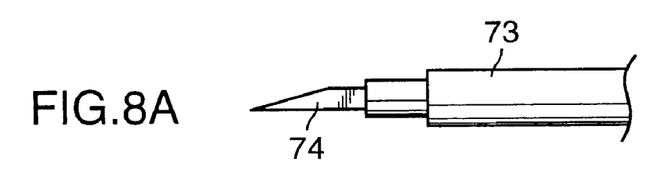
Figure 8B:
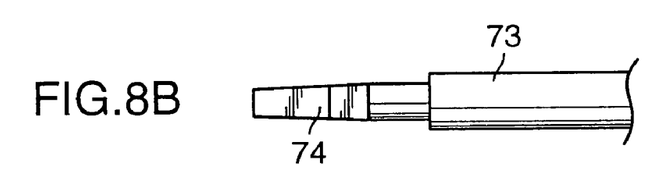
Figure 8C:
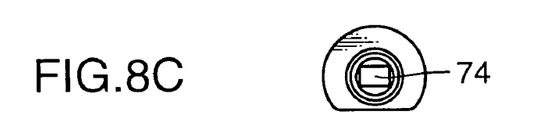

For example, the shape of the end portion of the tip 4 may not be limited to the triangle in front elevation, but may take various shapes depending on the shapes and sizes of the parts to be held by the tips. FIGS. 7 and 8 show variations of the tips 4. FIGS. 7A and 8A are front elevations, FIGS. 7B and 8B are plan views and FIGS. 7C and 8C are left side elevations. The tip 64 provided on the leg 63 shown in FIG. 7 is trapezoidal and tapered toward the end as seen in the plan view. The tip 74 provided on the leg 73 shown in FIG. 8 has larger width at the end portion and has a trapezoidal shape but close to a rectangular shape slightly tapered toward the end as seen in the plan view.

What is claimed is:

1. An electric heating device, having a substantially rod-shaped body for applying heat from an end portion of the body to an outside material, the heating device comprising:
 a tip for applying heat from the tip to the outside material;
 a heat generating member which is electrically energized to generate heat for heating the end portion of the body, the heat generating member including a heater core of high heat conductive material and a heating coil wound around the heater core, the heater core being coupled with the tip such that the tip and the core extend serially in the longitudinal direction of the body;
 a temperature sensor located within the tip to detect the temperature at the tip, the temperature sensor being located distant from the heat generating member in the longitudinal direction of the body; and
 a sensor insulating pipe located within the body between the heating coil and the temperature sensor along the longitudinal direction of the electric heating device to make the heating coil and the temperature sensor distant from each other, and a sensor lead wire connected with the temperature sensor and extending through the sensor insulating pipe.

2. An electric heating device having a substantially rod-shaped body for applying heat from an end portion of the body to an outside material, the heating device comprising:
 a tip for applying heat from the tip to the outside material;
 a heat generating member which is electrically energized to generate heat for heating the end portion of the body, the heat generating member including a heater core of high heat conductive material and a heating coil wound around the heater core, the heater core being coupled with the tip such that the tip and the core extend serially in the longitudinal direction of the body;
 a temperature sensor located within the tip to detect the temperature at the tip, the temperature sensor being located distant from the heat generating member in the longitudinal direction of the body;
 a heater lead wire connected with the heat generating member and extending within the body in the longitudinal direction of the body, and a sensor lead wire connected with the temperature sensor and extending within the body in the longitudinal direction of the body, each of the heater lead wire and the sensor lead wire having an exposed portion exposed to the outside of the body to be electrically connected with an outside terminal; and
 a wire supporting member formed with a wire receiving hole for receiving a free end portion of the heater lead wire or the sensor lead wire, and an opening which is open sideways for communicating the wire receiving hole with the outside of the body to expose the exposed portion to the outside.

3. An electric heating device according to claim 2, wherein a surface of the exposed portion of the heater lead wire or the sensor lead wire is treated to reduce contact resistance.

4. An electric heating device according to claim 2, wherein the exposed portion is nickel-plated.

5. An electric heating device having a substantially rod-shaped body for applying heat from an end portion of the body to an outside material, the heating device comprising:
 a tip for applying heat from the tip to the outside material;
 a heat generating member which is electrically energized to generate heat for heating the end portion of the body, the heat generating member including a heater core of high heat conductive material and a heating coil wound around the heater core, the heater core being coupled with the tip such that the tip and the core extend serially in the longitudinal direction of the body; and
 a temperature sensor located within the tip to detect the temperature at the tip, the temperature sensor being located distant from the heat generating member in the longitudinal direction of the body;

wherein the tip has a first end portion adapted to heat the outside material, a middle portion for accommodating the temperature sensor therein, and a second end portion to be coupled to the heater core, and wherein the diameter of the middle portion is smaller than that of the second end portion.

6. An electric heating device according to claim 5, further comprising a heater lead wire connected with the heat generating member and extending within the body in the longitudinal direction of the body, and a sensor lead wire connected with the temperature sensor and extending within the body in the longitudinal direction of the body, each of the heater lead wire and the sensor lead wire having an exposed portion exposed to the outside of the body to be electrically connected with an outside terminal.

7. A handheld tweezer-type electric part handling device for mounting the electric heating devices of claim 5, said part handling device comprising:
a housing,
a fixed leg attached to the housing,
a movable leg attached to the housing and approximately located adjacent and parallel to the fixed leg, the movable leg adapted to move relative to the fixed leg to hold an electric part therebetween and wherein each leg includes one of said electric heating devices, and
a sleeve for receiving the electric heating device.

8. A handheld device according to claim 7, wherein the body and the tip extend in a substantially straight manner and an included angle of the legs is between 10° and 14° when the legs are closed.

9. A handheld device according to claim 8, wherein the included angle is 12°.

10. An electric soldering iron comprising:
a substantially rod-shaped body including a tip for applying heat from the tip to an electric part;
a heat generating member which is electrically energized to generate heat for heating the tip, the heat generating member includes a heater core of high heat conductive material and a heating coil wound around the heater core, the heater core being coupled with the tip such that the tip and the core extend serially in the longitudinal direction of the body; and
a temperature sensor located within the tip to detect the temperature at the tip, the temperature sensor being located distant from the heat generating member in the longitudinal direction of the body;
wherein the tip has a first end portion adapted to heat the outside material, a middle portion for accommodating the temperature sensor therein, and a second end portion to be coupled with the heater core, and wherein the diameter of the middle portion is smaller than that of the second end portion.

11. An electric heating device having an elongated body with a first end and a second end, the electric heating device comprising:
a heat generating member near the first end of the electric heating device capable of converting electric energy to heat;
a temperature sensor located closer to the first end than the heat generating member capable of detecting the temperature of the first end of the electric heating device; and a lead wire communicably coupled to the temperature sensor for transmitting the detected temperature to a control device; and
a sensor insulating pipe for enclosing the lead wire along at least a portion thereof and located between the temperature sensor and the heat generating member along the longitudinal direction of the electric heating device providing a predetermined distance between the temperature sensor and the heat generating member along the longitudinal direction.

12. An electric heating device according to claim 11, where the temperature sensor is located in a forward portion of the body, the heat generating member includes a heater core of a high heat conductive material, and a heating coil wound around the heater core, and heat is conducted through the heater core in the longitudinal direction of the body from the heat generating member to the first end of the body.

13. An electric heating device according to claim 11, further comprising a heater lead wire connected with the heat generating member and extending within the body in the longitudinal direction of the body, and a sensor lead wire connected with the temperature sensor and extending within the body in the longitudinal direction of the body, each of the heater lead wire and the sensor lead wire having an exposed portion exposed to outside of the body to be electrically connected with an outside terminal.

14. An electric heating device according to claim 13, further comprising a wire supporting member formed with a wire receiving hole for receiving a free end portion of the heater lead wire or the sensor lead wire, and a side opening for communicating the wire receiving hole with the outside of the body to expose the exposed portion to the outside.

15. An electric heating device according to claim 14, where a surface of the exposed portion of the heater lead wire or the sensor lead wire is treated to reduce contact resistance.

16. An electric heating device according to claim 14, where the exposed portion is nickel-plated.

17. An electric heating device having a first end and a second end and capable of generating heat near the first end, the electric heating device comprising:
a heat generating member for generating heat;
means for conducting the generated heat to the first end:
means for sensing temperature near the first end away from the heat generating member along the longitudinal axis of the electrical heating device;
means for conducting power through the second end and transferring the power to the heat generating member;
means for transferring the sensed temperature to a control circuit; and
means for protecting said means for transferring between said heat generating member and said means for sensing temperature, said means for protecting serving to make said means for sensing distant from the heat generating member.

* * * * *